(12) United States Patent
Park et al.

(10) Patent No.: US 12,282,459 B2
(45) Date of Patent: Apr. 22, 2025

(54) TERMINAL AND METHOD FOR STORING AND PARSING LOG DATA

(71) Applicant: S2W INC., Seongnam-si (KR)

(72) Inventors: Ji Su Park, Seoul (KR); Seung Hyeon Lee, Hwaseong-si (KR); Hye Mi Kim, Seoul (KR)

(73) Assignee: S2W INC., Seongnam-si (KR)

( * ) Notice: Subject to any disclaimer, the term of this patent is extended or adjusted under 35 U.S.C. 154(b) by 0 days.

(21) Appl. No.: 18/097,875

(22) Filed: Jan. 17, 2023

(65) Prior Publication Data

US 2023/0237019 A1 Jul. 27, 2023

(30) Foreign Application Priority Data

Jan. 26, 2022 (KR) ........................ 10-2022-0011254

(51) Int. Cl.
*G06F 16/17* (2019.01)
*G06F 16/906* (2019.01)

(52) U.S. Cl.
CPC ........ *G06F 16/1734* (2019.01); *G06F 16/906* (2019.01)

(58) Field of Classification Search
CPC ..... G06F 16/90; G06F 16/906; G06F 16/1734
See application file for complete search history.

(56) References Cited

U.S. PATENT DOCUMENTS

| | | | |
|---|---|---|---|
| 8,079,081 B1* | 12/2011 | Lavrik | H04L 41/069 726/22 |
| 2002/0147747 A1* | 10/2002 | Zaharkin | G06F 40/143 715/234 |
| 2009/0228507 A1* | 9/2009 | Jain | G06F 16/245 707/999.102 |
| 2016/0350165 A1* | 12/2016 | LeMond | G06F 11/0787 |
| 2022/0019588 A1* | 1/2022 | Jha | G06F 16/1734 |

FOREIGN PATENT DOCUMENTS

| | | |
|---|---|---|
| KR | 10-2012-0065819 A | 6/2012 |
| KR | 10-2017-0047856 A | 5/2017 |
| KR | 10-1826828 B1 | 2/2018 |
| KR | 10-2019-0047473 A | 5/2019 |
| KR | 10-2122968 B1 | 6/2020 |

* cited by examiner

*Primary Examiner* — Allen S Lin
(74) *Attorney, Agent, or Firm* — Sughrue Mion, PLLC (57) ABSTRACT

Provided are a terminal and method for storing and parsing log data. The method includes collecting log data on the basis of a file path of the log data, storing metadata including the file path and log data paired with the metadata in a database (DB), classifying the log data on the basis of the metadata, acquiring type information of a parser related to the log data, and parsing the log data through the parser having the type information.

4 Claims, 10 Drawing Sheets

TERMINAL AND METHOD FOR STORING AND PARSING LOG DATA

CROSS-REFERENCE TO RELATED APPLICATION

This application claims priority to and the benefit of Korean Patent Application No. 2022-0011254, filed on Jan. 26, 2022, the disclosure of which is incorporated herein by reference in its entirety.

BACKGROUND

1. Field of the Invention

The present specification relates to a device and method for storing and parsing various types of log data.

2. Discussion of Related Art

Log data is behavior-based data used for various purposes such as checking a user's late use and behavior pattern, user clustering, modeling, etc. In other words, log data is data that may be automatically written to contain task information of a process for such purposes. For example, in the case of a log generated as a file, characteristics of a path to save the file and a form of the log written in the file vary greatly depending on a creator or a developed program and a type of data to be saved.

Such a log file may be a log generated in a device or a log collected from the outside. To build a database (DB) for searching for and managing specific information in each log file, a parser for parsing the log file according to the type of log file is necessary.

SUMMARY OF THE INVENTION

The present specification is directed to loading log data which is stored in the form of files in a distributed file system at once and reprocessing the loaded log data into a desired data format.

Objects of the present specification are not limited to that described above, and other objects which have not been described above will be clearly understood by those of ordinary skill in the art from the following detailed description of the specification.

According to an aspect of the present specification, there is provided a method of storing and parsing log data by a terminal, the method including collecting log data on the basis of a file path of the log data, storing metadata including the file path and log data paired with the metadata in a database (DB), classifying the log data on the basis of the metadata and acquiring type information of a parser related to the log data, and parsing the log data through the parser having the type information.

The parser may extract specific information included in the log data and store the specific information.

The acquiring of the type information of the parser may be performed on the basis of a preset mapping file, and the mapping file may include regular expression information related to the file path and the type information mapped to the regular expression information.

The regular expression information may indicate a folder name representing a generation environment of the log data in the file path.

The method may further include parsing the log data through all set parsers when the type information of the parser is not acquired on the basis of the mapping file.

The parsing of the log data through all the set parsers may further include adding type information of a parser showing best performance as a result of parsing the log data among all the set parsers to the mapping file.

According to another aspect of the present specification, there is provided a terminal for storing and parsing log data, the terminal including a memory including a DB, a communication module, and a processor configured to functionally control the memory and the communication module. The processor collects log data on the basis of a file path of the log data, stores metadata including the file path and log data paired with the metadata in the DB, classifies the log data on the basis of the metadata, acquires type information of a parser related to the log data, and parses the log data through the parser having the type information.

BRIEF DESCRIPTION OF THE DRAWINGS

The above and other objects, features and advantages of the present specification will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter exemplary embodiments disclosed in the present specification will be described in detail with reference to the accompanying drawings. Throughout the drawings, like reference numerals refer to like elements, and overlapping descriptions thereof will be omitted. The terms "module" and "unit" for elements used in the following description are given or interchangeably used in consideration of only the ease of drafting the specification and do not have meanings or roles distinct from each other. In describing the exemplary embodiments disclosed in the present specification, when it is determined that a detailed description of relevant known technology may obscure the subject matter of an exemplary embodiment disclosed herein, the detailed description will be omitted. Also, the accompanying drawings are only for easy understanding of the exemplary embodiments disclosed herein, and the technical spirit disclosed herein is not limited by the accompanying drawings. It is to be understood that the present specification includes all modifications, equivalents, and substitutions within the spirit and technical scope of the present specification.

Terms including ordinal numbers, such as "first," "second," etc., may be used for describing various elements, but the elements are not limited by the terms. The terms are only used for the purpose of distinguishing one element from another.

When an element is referred to as being "connected" or "coupled" to another element, the element may be directly connected or coupled to the other element, or an intermediate element may be therebetween. On the other hand, when an element is referred to as being "directly connected" or "directly coupled" to another element, there is no intermediate element may be therebetween.

The singular forms include the plural forms as well unless the context clearly indicates otherwise.

In this specification, the terms "comprises," "comprising," "includes," "including," "has," "having," etc. indicate the presence of features, integers, steps, operations, elements, parts, or combinations thereof stated herein and do not preclude the possibility of presence or addition of one or more other features, integers, steps, operations, elements, parts, or combinations thereof.

Figure 1:
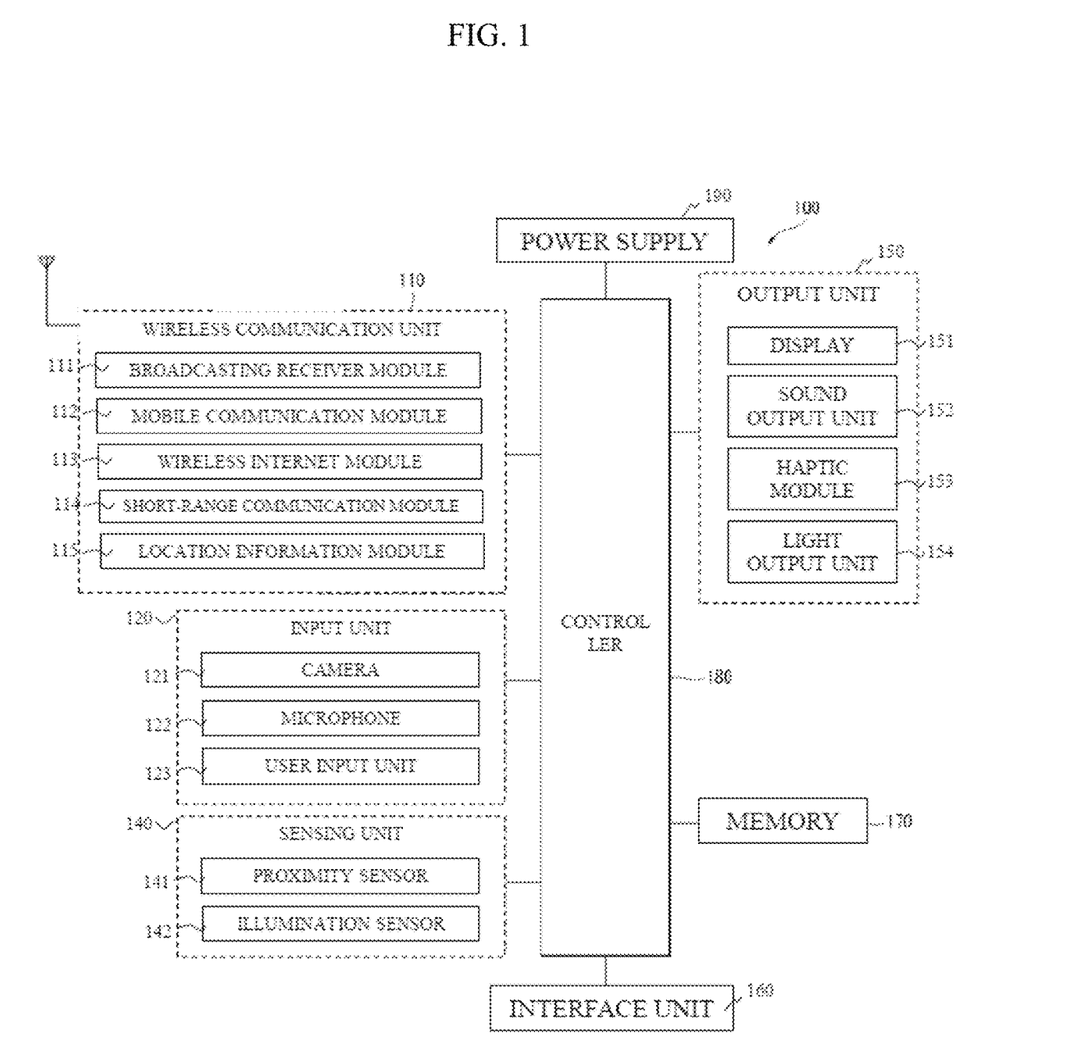
FIG. 1 is a block diagram illustrating an electronic device related to the present specification.

FIG. 1 is a block diagram illustrating an electronic device related to the present specification.

An electronic device 100 may include a wireless communication unit 110, an input unit 120, a sensing unit 140, an output unit 150, an interface unit 160, a memory 170, a controller 180, a power supply 190, etc. The elements shown in FIG. 1 are not essential to implementing the electronic device 100, and thus the electronic device 100 described herein may have more or fewer elements than listed above.

More specifically, among the elements, the wireless communication unit 110 may include one or more modules that allow wireless communication between the electronic device 100 and a wireless communication system, between the electronic device 100 and another electronic device 100, or between the electronic device 100 and an external server. Also, the wireless communication unit 110 may include one or more modules that connect the electronic device 100 to one or more networks.

The wireless communication unit 110 may include at least one of a broadcast receiver module 111, a mobile communication module 112, a wireless Internet module 113, a short-range communication module 114, and a location information module 115.

The input unit 120 may include a camera 121 or a video input unit for video signal inputs, a microphone 122 or an audio input unit for audio signal inputs, and a user input unit 123 (e.g., a touch key, a push key (mechanical key), etc.) for receiving information from a user. Audio data or image data collected by the input unit 120 may be parsed and used as a control instruction of the user.

The sensing unit 140 may include one or more sensors for sensing at least one of internal information of the electronic device 100, surrounding information of the electronic device 100, and user information. For example, the sensing unit 140 may include at least one of a proximity sensor 141, an illumination sensor 142, a touch sensor, an acceleration sensor, a magnetic sensor, a gravity (G)-sensor, a gyroscope sensor, a motion sensor, a red green blue (RGB) sensor, an infrared (IR) sensor, a finger scan sensor, an ultrasonic sensor, an optical sensor (e.g., the camera 121), the microphone 122, a battery gauge, an environment sensor (e.g., a barometer, a hygrometer, a thermometer, a radiation detection sensor, a heat detection sensor, a gas detection sensor, etc.), and a chemical sensor (e.g., an electronic nose, a healthcare sensor, a biometric sensor, etc.). Meanwhile, the electronic device 100 disclosed herein may use information detected by at least two of the sensors in combination.

The output unit 150 is for generating an output related to the sense of sight, the sense of hearing, the sense of touch, etc. and may include at least one of a display 151, a sound output unit 152, a haptic module 153, and a light output unit 154. The display 151 may constitute a mutual layer structure with a touch sensor or may be integrated with a touch sensor, thereby implementing a touch screen. The touch screen may not only function as the user input unit 123 that provides an input interface between the electronic device 100 and the user but may also provide an output interface between the electronic device 100 and the user.

The interface unit 160 may serve as a passage to various types of external devices connected to the electronic device 100. The interface unit 160 may include at least one of a wired/wireless headset port, an external charger port, a wired/wireless data port, a memory card port, a port for connecting to a device equipped with an identification module, an audio input/output (I/O) port, a video I/O port, and an earphone port. When an external device is connected to the interface unit 160, the electronic device 100 may perform appropriate control related to the connected external device.

Also, the memory 170 stores data that supports various functions of the electronic device 100. The memory 170 may store a plurality of application programs or applications run on the electronic device 100 and data and commands for operations of the electronic device 100. At least some of the application programs may be downloaded from an external server through wireless communication. Also, at least some of the application programs may exist on the electronic device 100 from the time of shipment for the purpose of basic functions (e.g., a call receiving and sending function and a message receiving and sending function) of the electronic device 100. Meanwhile, the application programs may be stored in the memory 170, installed on the electronic device 100, and run by the controller 180 to perform operations (or functions) of the electronic device 100.

In addition to operations related to the application programs, the controller 180 generally controls overall operations of the electronic device 100. The controller 180 may provide or process appropriate information or functions for the user by processing signals, data, information, etc. input or output through the above-described elements or running the application programs stored in the memory 170.

Also, to run the application programs stored in the memory 170, the controller 180 may control at least some of the elements described above with reference to FIG. 1. Further, to run the application programs, the controller 180 may operate at least two of the elements included in the electronic device 100 in combination with each other.

The power supply 190 receives external power or internal power and supplies the power to each of the elements included in the electronic device 100 under the control of the controller 180. The power supply 190 includes a battery, and the battery may be an embedded battery or a removable battery.

At least some of the elements may operate in cooperation with each other to implement operations, control, or a control method of the electronic device 100 according to various exemplary embodiments described below. Also, the operations, the control, or the control method of the electronic device 100 may be implemented on the electronic device 100 by running at least one application program stored in the memory 170.

In the present specification, the electronic device 100 may be called a "terminal."

Figure 2:
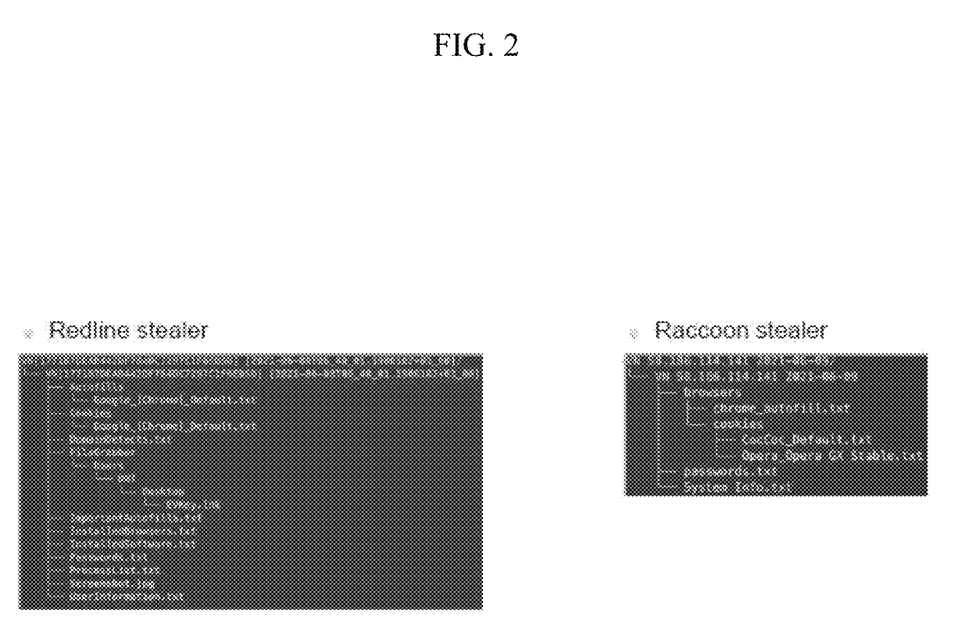
FIGS. 2 to 4 show examples of various types of log data that are applicable to the present specification.
Figure 3:
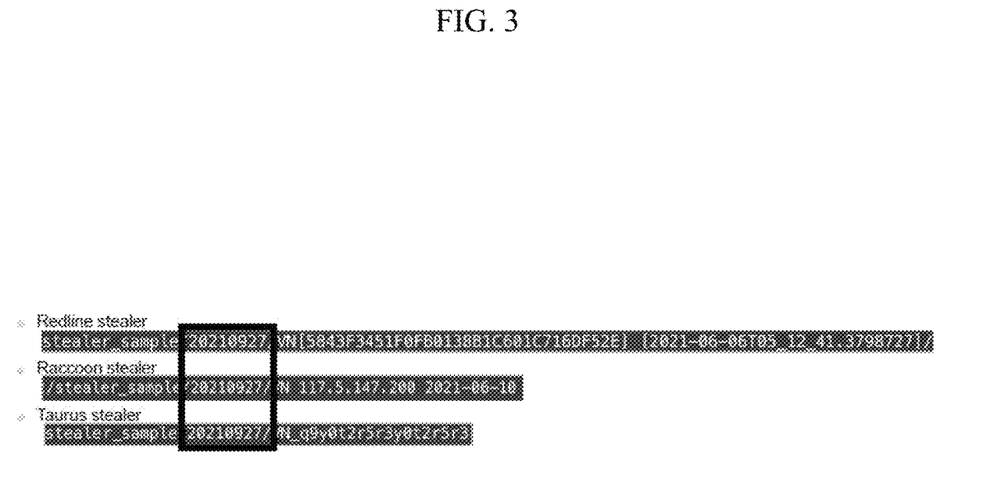
Figure 4:
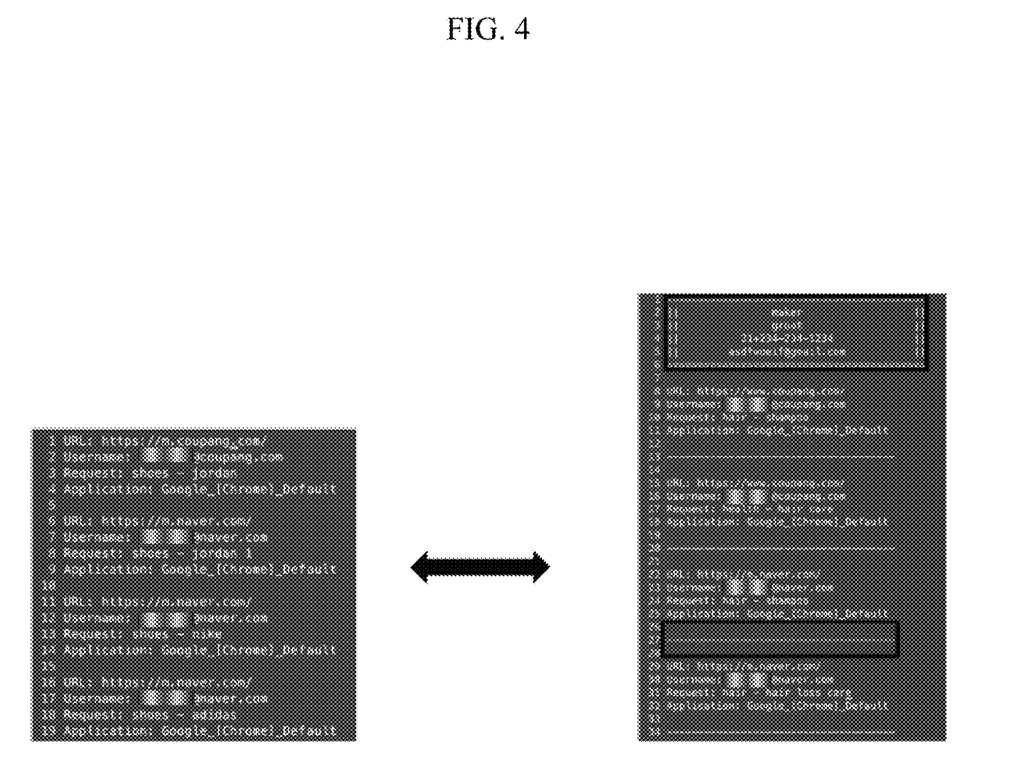

FIGS. 2 to 4 show examples of various types of log data that are applicable to the present specification.

To parse log data, N×M parsers are generally required for N types and M versions of files. When it is possible to identify the same type of files and the same version of files, the number of parsers to be generated can be considerably reduced. For example, assuming that 10 types of log programs have five versions, it is necessary to generate 5×10=50 parsers in total.

Referring to FIG. 2, a folder structure in which log data is stored may vary depending on an operating system (OS), a program, and a creator. For example, the depth of a folder may be great, or locations of files having the same name may be different. Also, the names of parent folders attached to files having the same name in an absolute path may be different.

Referring to FIG. 3, different types of collected log files may be mixed in one folder. For example, when the single collected log folder includes various types of log files, a problem may arise. In other words, although it is possible to see that log data is of different types by referring to next folders, the log data may be collected in one folder corresponding to the same date. As a result, it is necessary to solve this problem to perform search and processing tasks in one database (DB).

Referring to FIG. 4, the same type of log data may be stored in slightly different forms. For example, log data contains the same information but may vary in form because creator information or delimiters are added. In this case, the same type of files having different internal data formats are stored together, and thus it is difficult to determine which parser to use.

Figure 5:
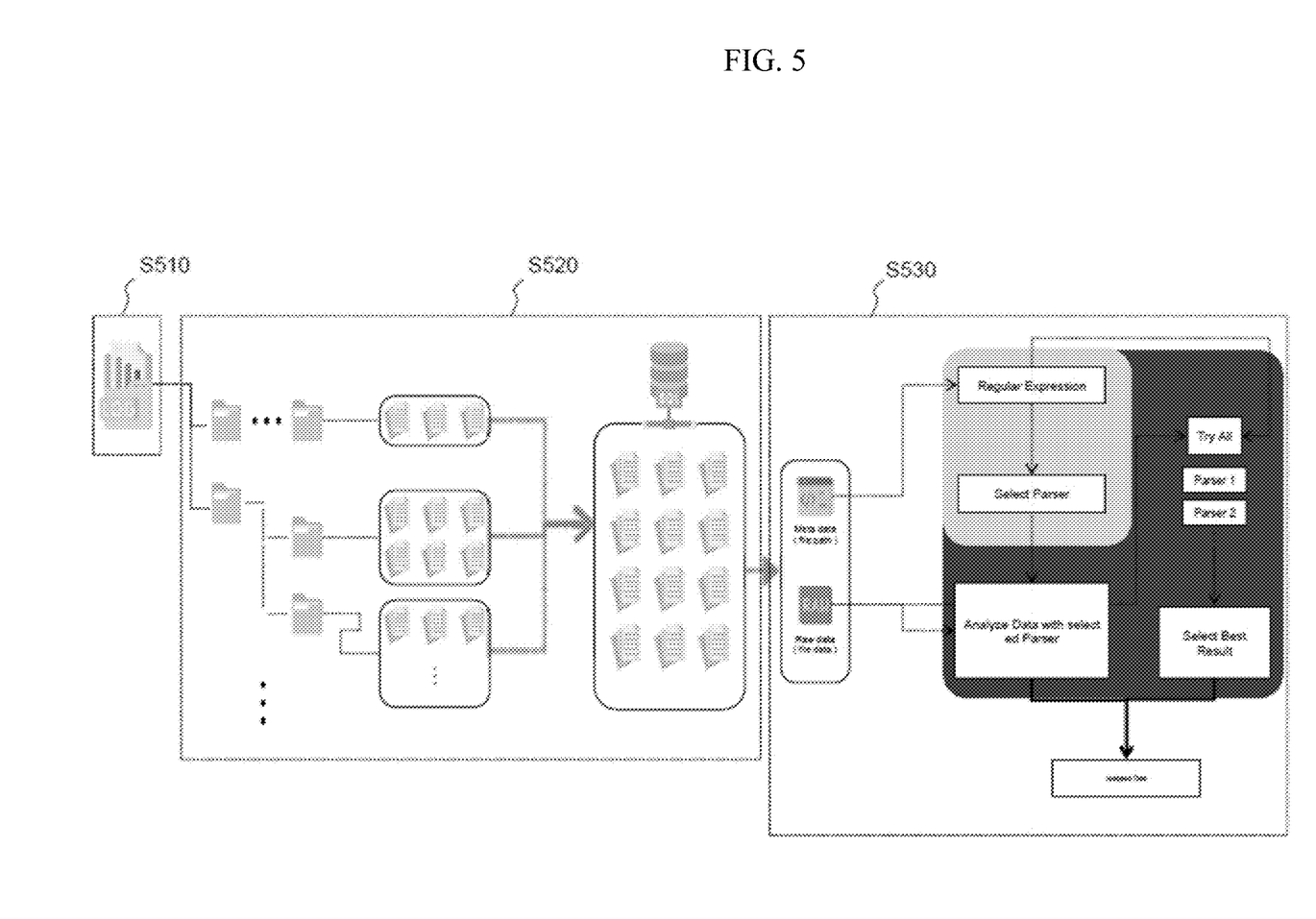
FIG. 5 is a diagram of an exemplary embodiment to which the present specification is applicable.

FIG. 5 is a diagram of an exemplary embodiment to which the present specification is applicable.

FIG. 5 illustrates a method of effectively storing log data in a file system without metadata and obtaining desired information by extracting data.

S510: For example, log files may have different internal folder structures according to OSs, programmers, program types, etc. In particular, a folder structure may greatly vary depending on a program. Accordingly, it requires a large amount of resources (time, manpower, etc.) to classify, store, and parse log files. To solve this problem, a method of storing all log data together and generating an integrated parser (or analyzer, Hereinafter referred to as parser) for processing a wide range of log data is necessary.

S520: Although log files have a large variety of structures, substantially necessary data has one form of file. Accordingly, following a folder structure to the end leads to acquisition of desired files. These files may be substantial targets of collection. Therefore, when metadata including the overall path of each file and raw file data are stored in a DB, log data may be stored in one DB (e.g., a relational DB (RDB)) regardless of whether the log data has different structures.

S530: In the case of loading one piece of log data from the DB in which log data is stored, it is necessary to know which type of data target data is in order to appropriately parse the target data.

For example, to find out a type of target data, a path that is stored together with log data may be matched to a regular expression.

For such regular expression matching, a regular expression which defines characteristics of a storage path for each type of log and a parser which may extract data from corresponding log files may be used.

For example, when there is a result matched through the regular expression in a path, parsing is performed through a matching parser. When there is no matching result, all parsers are executed to return the best result, and files and results are separately stored so that regular expression matching later becomes more precise.

In this way, a large amount of log data stored in one storage is not classified at a code level but is automatically classified, and data can be extracted by a parser which has already been generated. Also, results from new data types are continuously collected, added, and complemented to improve the precision of automation.

Figure 6:
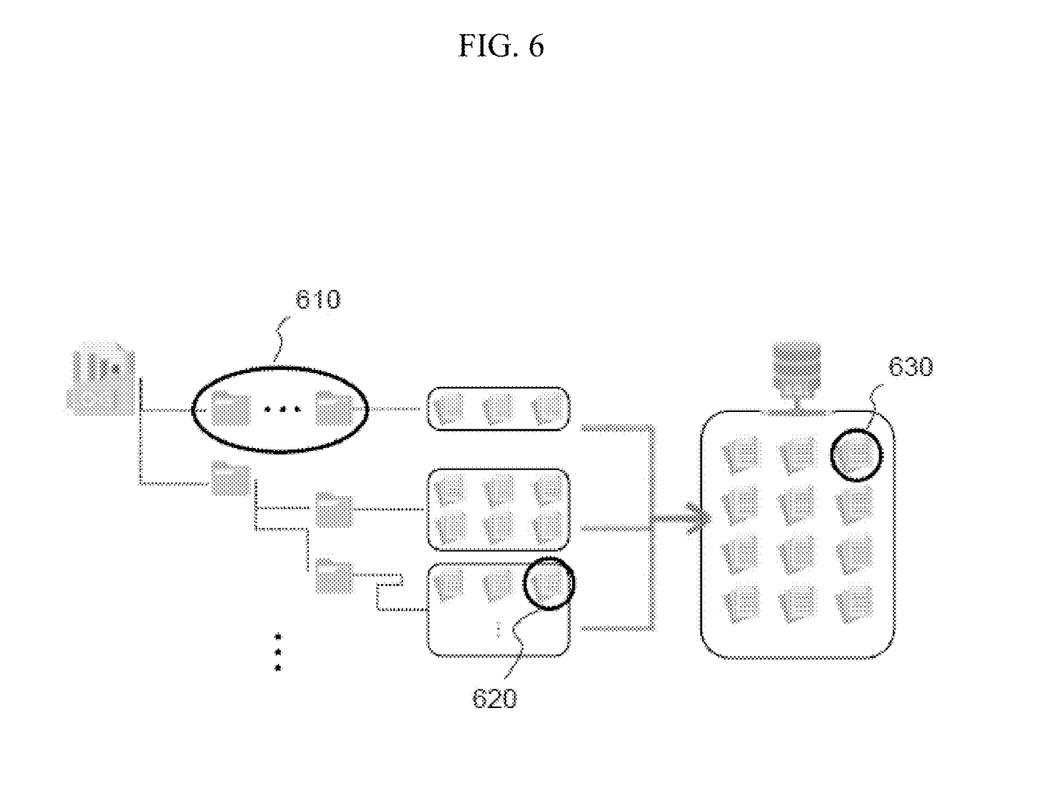
FIG. 6 shows an example of log data collection to which the present specification is applicable.

FIG. 6 shows an example of log data collection to which the present specification is applicable.

FIG. 6 illustrates collection of log data 620 by a terminal in detail.

The terminal may collect the log data 620. A folder 610 in which the log data 620 is present may vary in structure, form, depth, etc. When the log data 620 is stored in a DB, metadata 630 may be included. For example, the metadata 630 is information on the log data 620 and may include overall path information of the folder 610 in which the log data 620 is present.

Through regular expression matching in classification to be described below, it may be determined which parser will be used in analyzing stored log data. In this case, an absolute path of the original log data may be required and acquired through the metadata 630.

The terminal may convert characteristics of only the log data 620 which are found from the absolute path into a regular expression and use the converted regular expression in classification. When the terminal fails in classification, the terminal may find out a new pattern, convert the pattern into a regular expression, and store the regular expression.

Figure 7:
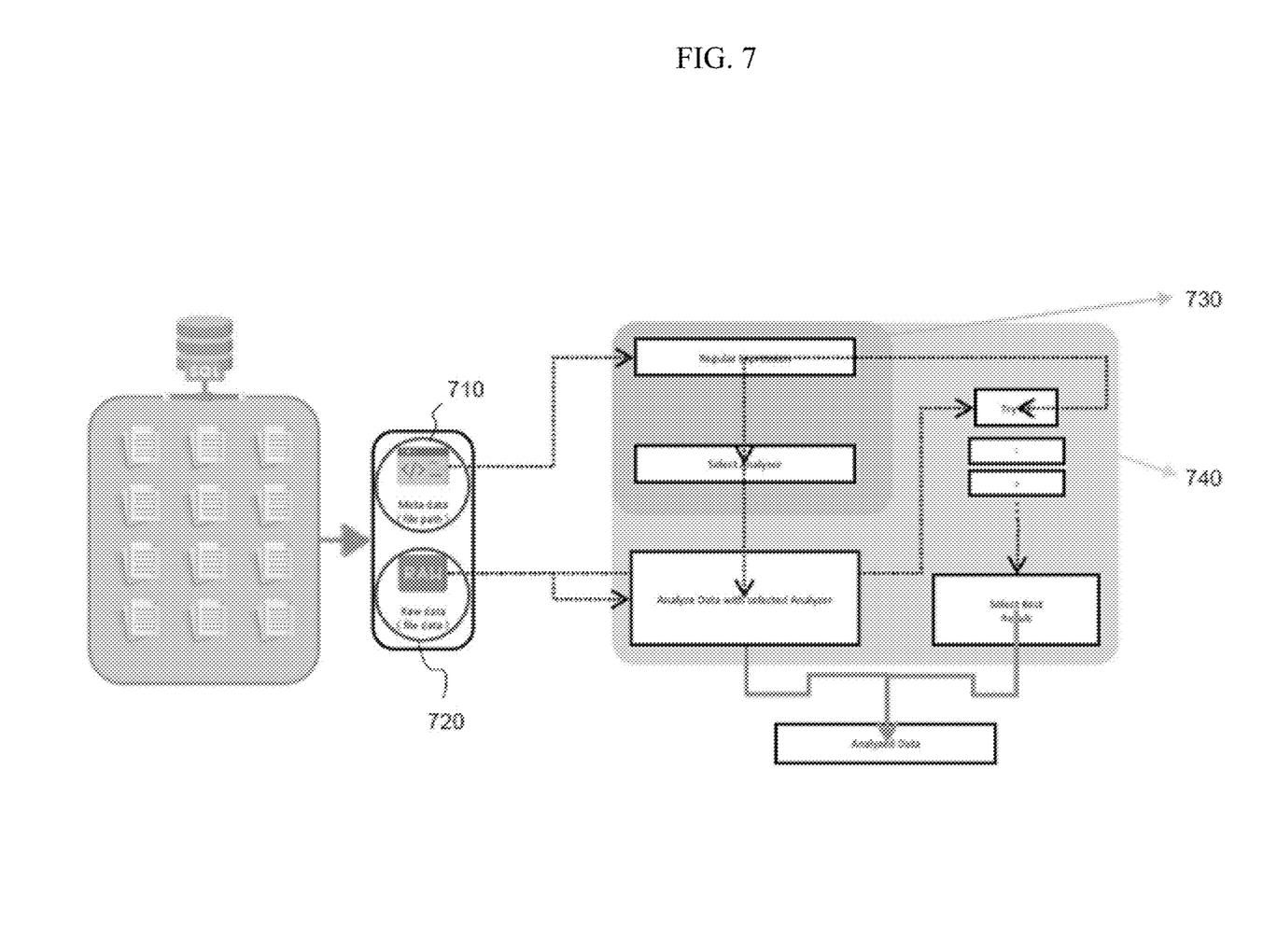
FIG. 7 shows an example of log data classification and parsing to which the present specification is applicable.

FIG. 7 shows an example of log data classification and parsing to which the present specification is applicable.

Referring to FIG. 7, the terminal may extract information on one file (metadata 710 and log data 720) from a DB and perform classification and analysis through roughly two operations.

In the first operation, the terminal may read an absolute path from the metadata 710 and then determine whether there is a parser for analyzing the log data 720 through regular expression matching. For example, regular expression matching of converting a unique portion of the absolute path into a regular expression may have logic for determining whether the input path has a portion corresponding to the regular expression.

The terminal may determine one or two folder names having characteristics among several folders through a regular expression. In other words, when a regular expression that is too general is used, a false positive rate may increase. In practice, different regular expressions may be parsed through the same parser so that several regular expressions may be linked to one parser. To prevent this, the terminal may convert a regular expression on the basis of the most unique folder name and use the converted regular expression.

In the second operation, the terminal may input the log data 720 to an appropriate parser 730 found in the first operation and analyze the log data 720. The parser 730 may extract required data in accordance with requirements (740).

When the appropriate parser 730 is not found, the terminal may test all parsers thereof and return a parser having the best result and the result.

While repeating the above-described process, the terminal may add a parser and a path pattern of log data that is determined to be negative. In this way, the terminal can reduce a false negative rate.

Figure 8:
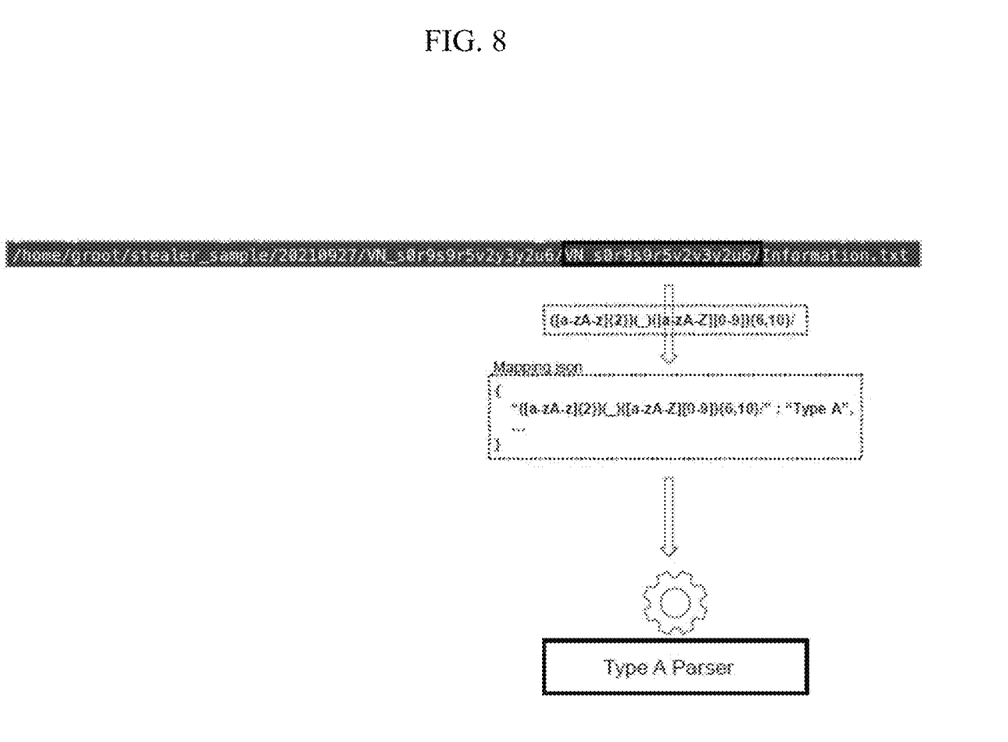
FIG. 8 shows an exemplary embodiment of a classification method to which the present specification is applicable.

FIG. 8 shows an exemplary embodiment of a classification method to which the present specification is applicable.

Referring to FIG. 8, the terminal may acquire file path information from metadata and find a parent folder for identifying a type of log data.

A parent folder is a folder with a name that has classifiable characteristics. For example, in FIG. 8, a parent folder is assumed to have the following characteristics.

(1) Country code: VN
(2) Delimiter: _ (underbar)
(3) ID: repetition of one letter and one numeral The terminal may extract a regular expression for finding a corresponding parent folder. A converted regular expression may be set in the smallest unit so that false positives do not occur.

The terminal may add the extracted regular expression and a type to a mapping file in connection with each other.

The terminal may add a newly generated regular expression and a type to a mapping file having already-generated regular expressions and types. For example, the mapping file may be in the JavaScript Object Notation (JSON) format or the like and may be an object having the form of a key value in code.

The regular expression to be added may be set in the smallest unit and added to match only one regular expression in the mapping file including many regular expressions. In this way, it is possible to expect a good parsing result.

The terminal may match an absolute path of the log data through the mapping file. When the absolute path of the log data matches a regular expression, the terminal may return type A stored in the mapping file so that the log data can be parsed using the corresponding type of parser.

Figure 9:
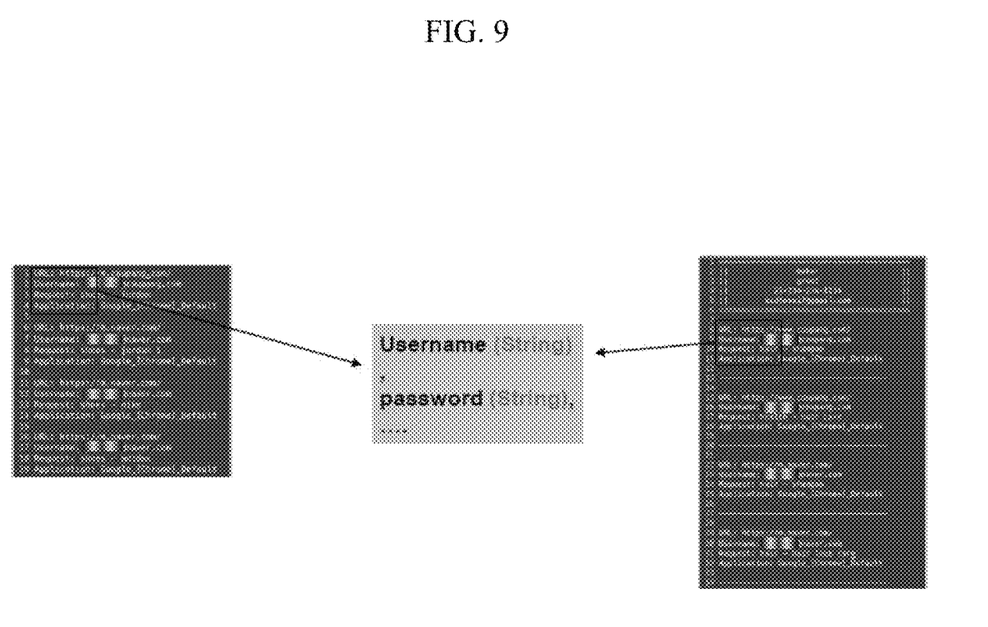
FIG. 9 shows an exemplary embodiment of a parsing method to which the present specification is applicable.

FIG. 9 shows an exemplary embodiment of a parsing method to which the present specification is applicable.

Referring to FIG. 9, the terminal may parse the log data through the returned type of parser. The parser specializes in the log data and thus can parse information included in the log data.

For more efficient parsing, the parser may select data that is necessary in and extractable from different types of log data in common. For example, different types of log data may include, in different forms, identical data created by different creators.

Generating separate parsers for the identical data involves a large amount of resources (manpower, time, computing resources, etc.), and thus the terminal may process several types of data using one parser that first selects necessary fields (keywords) among fields shown in common. Also, the parser may designate a data type for storing selected data.

In this way, the terminal may load log data which is stored in the form of a file in a distributed file system (e.g., the Hadoop file system) at once, reprocess the loaded log data into a desired data format, store the reprocessed log data in an index DB, search for data, and extract statistics.

Figure 10:
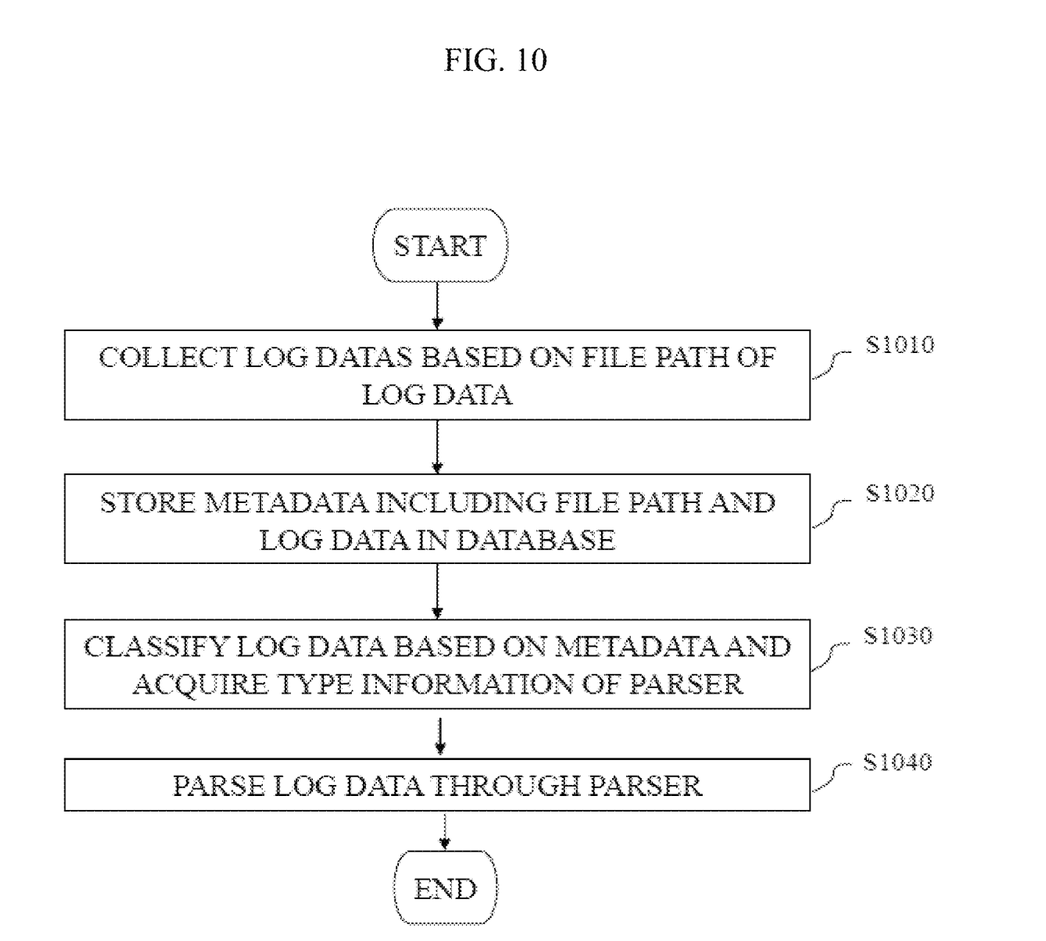
FIG. 10 is an exemplary embodiment of a terminal to which the present specification is applicable.

FIG. 10 is an exemplary embodiment of a terminal to which the present specification is applicable.

Referring to FIG. 10, the terminal may include a memory including a DB, a communication module, and a processor.

The terminal collects log data on the basis of file paths of the log data (S1010). The log data may be input by a user or randomly collected through a network. For example, the collected log data may be in the form of files and present in different folders. The terminal may collect the log data by finding paths of folders.

The terminal stores metadata including file paths and the log data (S1020). For example, the metadata may include overall path information of the folders in which the log data is present.

The terminal acquires type information of parsers by classifying the log data on the basis of the metadata (S1030).

For example, the terminal may acquire the path information of the log data from the metadata and acquire parsers on the basis of a mapping file. The mapping file may include regular expression information for matching the path information and type information of the parsers appropriate for log files acquired according to the path information.

For example, the regular expression information may indicate a folder name representing a generation environment of log data in a file path.

The terminal parses the log data through the parsers (S1040). For example, the parsers may extract and store information included in the corresponding log data. To this end, the parsers may be set to extract data that is necessary and common in log data.

When the type information of parsers is not acquired on the basis of the mapping file, the terminal may analyze the log data through all set parsers. In this case, type information of a parser showing best information in the analysis results may be added to the mapping file in pairs with regular expression information of the log data.

According to the exemplary embodiments of the present specification, it is possible to load log data which is stored in the form of files in a distributed file system at once and reprocess the loaded log data into a desired data format.

Effects of the present specification are not limited to that described above, and other effects which have not been described above will be clearly understood by those of ordinary skill in the art from the above detailed description.

The above-described present specification can be implemented as computer-readable code in a medium on which a program is recorded. The computer-readable medium is any type of recording device in which data readable by a computer system is stored. Examples of the computer-readable medium include a hard disk drive (HDD), a solid state disk (SSD), a silicon disk drive (SDD), a read-only memory (ROM), a random access memory (RAM), a compact disc (CD)-ROM, a magnetic tape, a floppy disk, an optical data storage device, etc. and also include implementation in the form of carrier waves (e.g., transmission over the Internet). Therefore, the detailed description above should not be interpreted as a limitation but should be considered as an example. The scope of the present specification should be determined by a reasonable interpretation of the appended claims, and all changes within the equivalent range of the present specification are within the scope of the present specification.

Although embodiments of the present specification have been described above, these are just examples and do not limit the present specification. Those skilled in the art to which the present specification pertains will be aware that several modifications and applications not exemplified above are possible without departing from the fundamental characteristics of the present specification. For example, each element specified in the embodiments can be implemented in a modified form. Also, such variants and their application-related differences should be interpreted as falling within the scope of the present specification defined in the appended claims.

What is claimed is:

1. A method of storing and parsing log data by a terminal including a plurality of parsers for analyzing the log data, the method comprising:
   collecting a plurality of pieces of log data on the basis of file paths of the plurality of pieces of log data;
   storing a plurality of pieces of metadata including the file paths and the plurality of pieces of log data paired with the plurality of pieces of metadata in a database (DB) stored in a memory of the terminal;
   classifying log data among the plurality of pieces of log data on the basis of metadata paired with the log data among the plurality of pieces of metadata and determining whether type information of a parser for analyzing the log data among the plurality of parsers is acquired on the basis of a preset mapping file; and
   parsing the log data through the parser having the acquired type information when the type information of the parser among the plurality of parsers is acquired on the basis of the preset mapping file,
   wherein the mapping file includes (i) regular expression information matched to the file path and (ii) the type information of the parser mapped to the regular expression information,
   wherein the acquiring of the type information of the parser comprises acquiring information of the file path from the metadata paired with the log data and acquiring the type information of the parser based on the regular expression information matched to the file path,
   wherein the regular expression information indicates a folder name representing a generation environment of the log data in the file path,
   wherein the method further comprises parsing the log data through all of the plurality of parsers when the type information of the parser is not acquired on the basis of the mapping file, and
   wherein the parsing of the log data through all of the plurality of parsers further comprises adding type information of a parser showing best performance as a result of parsing the log data among all of the plurality of parsers to the mapping file.

2. The method of claim 1, wherein the parser extracts specific information included in the log data and stores the specific information.

3. A terminal for storing and parsing log data, the terminal comprising:
   a plurality of parsers;
   a memory including a database (DB);
   a communication module; and
   a processor configured to functionally control the memory and the communication module,
   wherein the processor is further configured to:
      collect a plurality of pieces of log data on the basis of file paths of the plurality of pieces of log data,
      store a plurality of pieces of metadata including the file paths and the plurality of pieces of log data paired with the plurality of pieces of metadata in the database (DB),
      classify log data among the plurality of pieces of log data on the basis of metadata paired with the log data among the plurality of pieces of metadata and acquire type information of a parser for analyzing the log data among the plurality of parsers based on a preset mapping file, and
      parse the log data through the parser having the acquired type information,
   wherein the mapping file includes (i) regular expression information matched to the file path and (ii) the type information of the parser mapped to the regular expression information,
   wherein the processor is further configured to acquire information of the file path from the metadata paired with the log data and acquire the type information of the parser based on the regular expression information matched to the file path,
   wherein the regular expression information indicates a folder name representing a generation environment of the log data in the file path,
   wherein the processor is further configured to parse the log data through all of the plurality of parsers when the type information of the parser is not acquired on the basis of the mapping file, and
   wherein the processor is further configured to add type information of a parser showing best performance as a result of parsing the log data among all of the plurality of parsers to the mapping file.

4. The terminal of claim 3, wherein the parser extracts specific information included in the log data and stores the specific information.

* * * * *